US012801345B2

(12) United States Patent
Langhammer

(10) Patent No.: US 12,801,345 B2
(45) Date of Patent: Nov. 17, 2026

(54) FPGA PROCESSING BLOCK FOR MACHINE LEARNING OR DIGITAL SIGNAL PROCESSING OPERATIONS

(71) Applicant: Altera Corporation, San Jose, CA (US)

(72) Inventor: Martin Langhammer, Alderbury (GB)

(73) Assignee: Altera Corporation, San Jose, CA (US)

( * ) Notice: Subject to any disclaimer, the term of this patent is extended or adjusted under 35 U.S.C. 154(b) by 460 days.

(21) Appl. No.: 17/358,923

(22) Filed: Jun. 25, 2021

(65) Prior Publication Data

US 2021/0326111 A1 Oct. 21, 2021

(51) Int. Cl.

*G06F 7/523* (2006.01)
*G06F 7/50* (2006.01)

(52) U.S. Cl.

CPC ................ *G06F 7/523* (2013.01); *G06F 7/50* (2013.01)

(58) Field of Classification Search

CPC .......... G06F 7/50; G06F 7/523; G06F 7/5443; G06F 7/483; G06F 2207/3808–3824; G06F 17/16; G06F 9/3885–3897; G06F 17/14–142; H03H 17/00–08; G06N 3/02; G06N 3/0464; G06N 3/08; G06N 20/00; G06N 3/04; G06N 3/0475; G06N 3/0495; G06N 3/0499; G06N 3/047; G06N 3/0895; G06N 3/09; G06N 3/091; G06N 3/092;

(Continued)

(56) References Cited

U.S. PATENT DOCUMENTS 8,307,023 B1 * 11/2012 Leung .................. G06F 7/5324 708/625
8,706,790 B1 * 4/2014 Langhammer ........ G06F 7/4876 708/503

(Continued)

FOREIGN PATENT DOCUMENTS

EP 3330861 A1 6/2018
EP 3835940 A1 6/2021

(Continued)

OTHER PUBLICATIONS

International Search Report, International Application No. PCT/US2022/022008, mailed Jul. 4, 2022.

(Continued)

*Primary Examiner* — Andrew Caldwell
*Assistant Examiner* — Huy Duong
(74) *Attorney, Agent, or Firm* — Fletcher Yoder, P.C.

(57) ABSTRACT

The present disclosure describes a digital signal processing (DSP) block that includes a columns of weight registers that can receive values and inputs that can receive multiple first values and multiple second values, where the multiple first values may be stored in the weight registers after being received at the inputs. Additionally, the DSP block includes multipliers that, in a first mode of operation, simultaneously multiply each of the first values by a value of the multiple second values. The DSP block, in a second mode of operation, enables a first column of multipliers of the multipliers to multiply each of multiple third values by each of multiple fourth values, where at least one of the multiple third values or fourth values includes more bits than the first values and second values.

9 Claims, 15 Drawing Sheets

(58) Field of Classification Search
CPC ........ G06N 3/094; G06N 3/096; G06N 3/098; G06N 3/0985
See application file for complete search history.

(56) References Cited

U.S. PATENT DOCUMENTS

| | | | | |
|---|---|---|---|---|
| 10,489,116 | B1 | 11/2019 | Esposito | |
| 10,528,321 | B2 | 1/2020 | Bittner | |
| 2005/0144212 | A1 | 6/2005 | Simkins | |
| 2010/0325188 | A1* | 12/2010 | Olson | G06F 7/4876 708/620 |
| 2017/0322769 | A1* | 11/2017 | Langhammer | G06F 5/012 |
| 2017/0357891 | A1 | 12/2017 | Judd et al. | |
| 2018/0314671 | A1 | 11/2018 | Zhang | |
| 2019/0042252 | A1* | 2/2019 | Kaul | G06F 7/5443 |
| 2019/0042538 | A1* | 2/2019 | Koren | G06N 3/063 |
| 2019/0228051 | A1 | 7/2019 | Langhammer et al. | |
| 2019/0340489 | A1* | 11/2019 | Mills | G06F 7/523 |
| 2021/0157549 | A1* | 5/2021 | Elmer | G06F 7/5443 |
| 2021/0182022 | A1 | 6/2021 | Langhammer | |
| 2021/0311703 | A1* | 10/2021 | Kim | G06F 7/4876 |
| 2021/0312269 | A1* | 10/2021 | Kim | G06N 3/063 |
| 2021/0326118 | A1* | 10/2021 | Li | G06F 9/30 |
| 2022/0269950 | A1* | 8/2022 | Lee | G06N 3/045 |

FOREIGN PATENT DOCUMENTS

| | | | | |
|---|---|---|---|---|
| WO | 2018213628 | | 11/2018 | |
| WO | WO-2020067908 | A1 * | 4/2020 | G06F 7/5443 |

OTHER PUBLICATIONS

Extended European Search Report for EP Application No. 20196629.8 mailed Mar. 9, 2021.

Extended European Search Report for EP Application No. 20196801.3 mailed Mar. 10, 2021.

Extended European Search Report for EP Application No. 20196562.1 mailed Mar. 10, 2021.

* cited by examiner

FPGA PROCESSING BLOCK FOR MACHINE LEARNING OR DIGITAL SIGNAL PROCESSING OPERATIONS

BACKGROUND

The present disclosure relates generally to integrated circuit (IC) devices such as programmable logic devices (PLDs). More particularly, the present disclosure relates to a processing block that may be included on an integrated circuit device as well as applications that can be performed utilizing the processing block.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Integrated circuit devices may be utilized for a variety of purposes or applications, such as digital signal processing and machine learning. Indeed, machine learning and artificial intelligence applications have become ever more prevalent. Programmable logic devices may be utilized to perform these functions, for example, using particular circuitry (e.g., processing blocks). In some cases, particular circuitry may be designed to be effective for either digital signal processing or machine learning operations.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
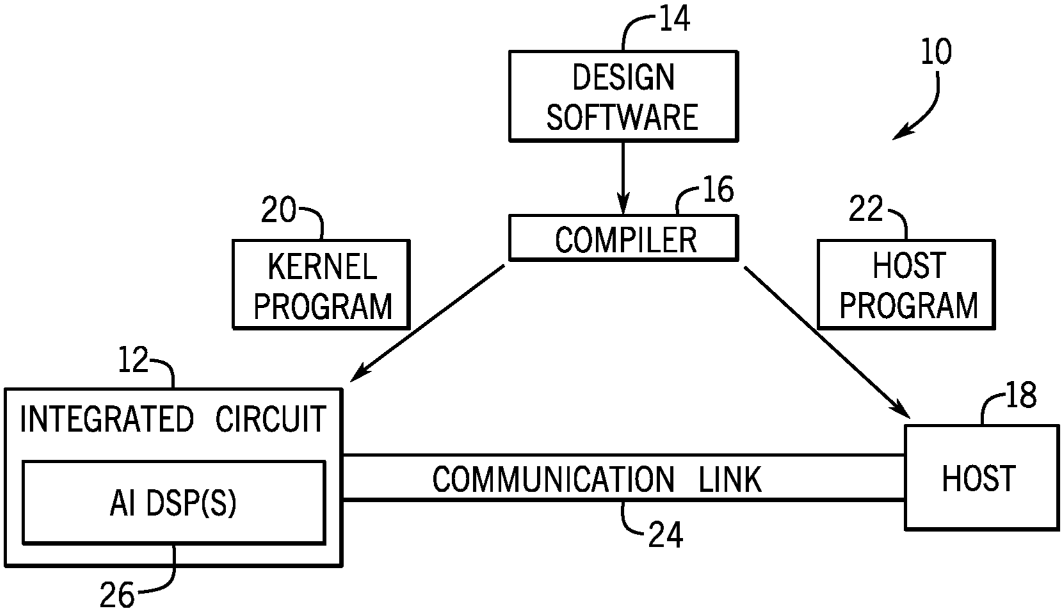
FIG. 1 is a block diagram of a system that may implement arithmetic operations using a DSP block, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

As machine leaning and artificial intelligence applications have become ever more prevalent, there is a growing desire for circuitry to perform calculations utilized in machine-leaning and artificial intelligence applications. To enable efficiency in hardware design, the same circuitry may also be desired to perform digital signal processing applications. The present systems and techniques relate to embodiments of a digital signal processing (DSP) block that may perform DSP-related functions with the same density as traditional FPGA DSP blocks. In general, a DSP block is a type of circuitry that is used in integrated circuit devices, such as field programmable gate arrays (FPGAs), to perform multiplication, accumulation, and addition operations.

The DSP block described herein may take advantage of the flexibility of an FPGA to adapt to emerging algorithms or fix bugs in a planned implementation. The AI FPGA may be reconfigurable to perform regular numeric operations in additional to AI operations by implementing an array of smaller multipliers, which are combined in several arrangements to produce 16-bit signed integer (INT16) values for Finite Signal Response (FIR) filtering, as well as provide full single-precision floating point (e.g., FP32) values, multiply functionalities, and add/accumulate functionalities that correspond to DSP operations.

The presently described techniques also provide improved computational density and reduced power consumption. For instance, as discussed herein, DSP blocks may perform virtual artificial intelligence applications in addition to traditional DSP functionalities that utilize FP32 values and INT16 values using the same DSP block logic components. Accordingly, the DSP block is configurable to function for artificial intelligence operations that may use relatively lower precision values and DSP functionalities that utilize relatively higher precision values. The ability to reconfigure existing logic improves computational density and reduces the number of programmable execution units used to perform DSP operations in an integrated circuit device, thus reducing cost (e.g., in terms of area occupied by DSP circuitry) of the integrated circuit device.

With this in mind, FIG. 1 illustrates a block diagram of a system 10 that may implement arithmetic operations using a DSP block. A designer may desire to implement functionality, such as the large precision arithmetic operations of this disclosure, on an integrated circuit device 12 (such as a field-programmable gate array (FPGA) or an application-specific integrated circuit (ASIC)). In some cases, the designer may specify a high-level program to be implemented, such as an OpenCL program, which may enable the designer to more efficiently and easily provide programming instructions to configure a set of programmable logic cells for the integrated circuit device 12 without specific knowledge of low-level hardware description languages (e.g., Verilog or VHDL). For example, because OpenCL is quite similar to other high-level programming languages, such as C++, designers of programmable logic familiar with such programming languages may have a reduced learning curve than designers that are required to learn unfamiliar low-level hardware description languages to implement new functionalities in the integrated circuit device 12.

The designers may implement their high-level designs using design software 14, such as a version of Intel® Quartus® by INTEL CORPORATION. The design software 14 may use a compiler 16 to convert the high-level program into a lower-level description. The compiler 16 may provide machine-readable instructions representative of the high-level program to a host 18 and the integrated circuit device 12. The host 18 may receive a host program 22 which may be implemented by the kernel programs 20. To implement the host program 22, the host 18 may communicate instructions from the host program 22 to the integrated circuit device 12 via a communications link 24, which may be, for example, direct memory access (DMA) communications or peripheral component interconnect express (PCIe) communications. In some embodiments, the kernel programs 20 and the host 18 may enable configuration of one or more DSP blocks 26 on the integrated circuit device 12. The DSP block 26 may include circuitry to implement, for example, operations to perform matrix-matrix or matrix-vector multiplication for AI or non-AI data processing. The integrated circuit device 12 may include many (e.g., hundreds or thousands) of the DSP blocks 26. Additionally, DSP blocks 26 may be communicatively coupled to another such that data outputted from one DSP block 26 may be provided to other DSP blocks 26.

While the techniques above discussion described to the application of a high-level program, in some embodiments, the designer may use the design software 14 to generate and/or to specify a low-level program, such as the low-level hardware description languages described above. Further, in some embodiments, the system 10 may be implemented without a separate host program 22. Moreover, in some embodiments, the techniques described herein may be implemented in circuitry as a non-programmable circuit design. Thus, embodiments described herein are intended to be illustrative and not limiting.

Figure 2:
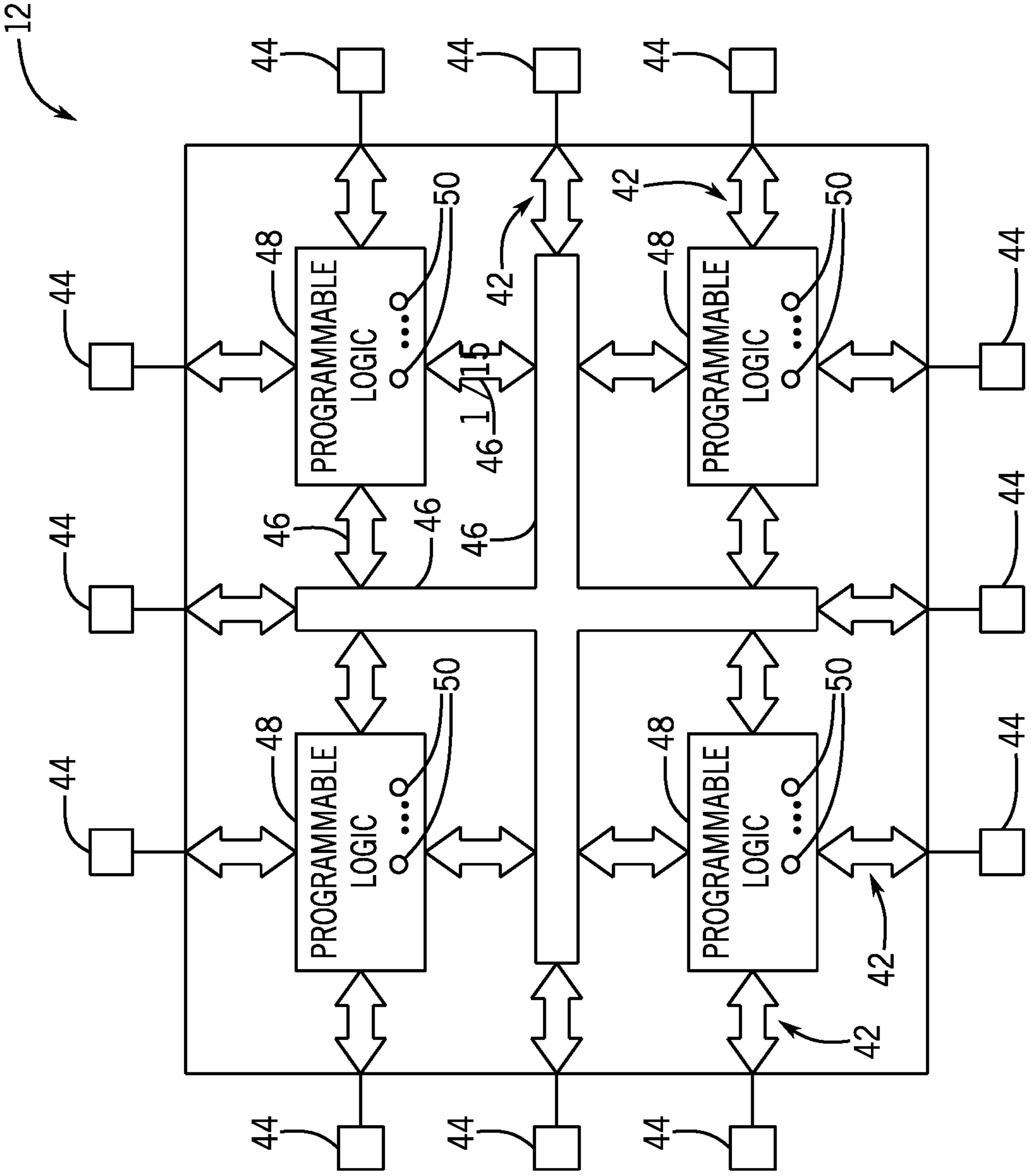
FIG. 2 is a block diagram of the integrated circuit device of FIG. 1, in accordance with an embodiment of the present disclosure.

Turning now to a more detailed discussion of the integrated circuit device 12, FIG. 2 illustrates an example of the integrated circuit device 12 as a programmable logic device, such as a field-programmable gate array (FPGA). Further, it should be understood that the integrated circuit device 12 may be any other suitable type of integrated circuit device (e.g., an application-specific integrated circuit and/or application-specific standard product). As shown, the integrated circuit device 12 may have input/output circuitry 42 for driving signals off device and for receiving signals from other devices via input/output pins 44. Interconnection resources 46, such as global and local vertical and horizontal conductive lines and buses, may be used to route signals on integrated circuit device 12. Additionally, interconnection resources 46 may include fixed interconnects (conductive lines) and programmable interconnects (e.g., programmable connections between respective fixed interconnects). Programmable logic 48 may include combinational and sequential logic circuitry. For example, programmable logic 48 may include look-up tables, registers, and multiplexers. In various embodiments, the programmable logic 48 may be configured to perform a custom logic function. The programmable interconnects associated with interconnection resources may be considered to be a part of the programmable logic 48.

Programmable logic devices, such as integrated circuit device 12, may contain programmable elements 50 within the programmable logic 48. For example, as discussed above, a designer (e.g., a customer) may program (e.g., configure) the programmable logic 48 to perform one or more desired functions. By way of example, some programmable logic devices may be programmed by configuring their programmable elements 50 using mask programming arrangements, which is performed during semiconductor manufacturing. Other programmable logic devices are configured after semiconductor fabrication operations have been completed, such as by using electrical programming or laser programming to program their programmable elements 50. In general, programmable elements 50 may be based on any suitable programmable technology, such as fuses, antifuses, electrically-programmable read-only-memory technology, random-access memory cells, mask-programmed elements, and so forth.

Many programmable logic devices are electrically programmed. With electrical programming arrangements, the programmable elements 50 may be formed from one or more memory cells. For example, during programming, configuration data is loaded into the memory cells using pins 44 and input/output circuitry 42. In one embodiment, the memory cells may be implemented as random-access-memory (RAM) cells. The use of memory cells based on RAM technology is described herein is intended to be only one example. Further, because these RAM cells are loaded with configuration data during programming, they are sometimes referred to as configuration RAM cells (CRAM). These memory cells may each provide a corresponding static control output signal that controls the state of an associated logic component in programmable logic 48. For instance, in some embodiments, the output signals may be applied to the gates of metal-oxide-semiconductor (MOS) transistors within the programmable logic 48.

Figure 3:
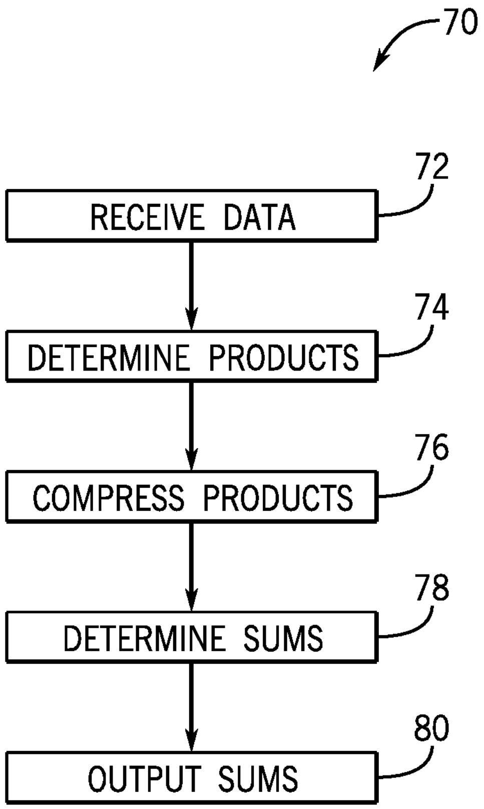
FIG. 3 is a flow diagram of a process the digital signal processing (DSP) block of the integrated circuit device of FIG. 1 may perform when conducting multiplication operations, in accordance with an embodiment of the present disclosure.

Keeping the foregoing in mind, the DSP block 26 discussed here may be used for a variety of applications and to perform many different operations associated with the applications, such as multiplication and addition. For example, matrix and vector (e.g., matrix-matrix, matrix-vector, vector-vector) multiplication operations may be well suited for both AI and digital signal processing applications. As discussed below, the DSP block 26 may simultaneously calculate many products (e.g., dot products) by multiplying one or more rows of data by one or more columns of data. Before describing circuitry of the DSP block 26, to help provide an overview for the operations that the DSP block 26 may perform, FIG. 3 is provided. In particular, FIG. 3 is a flow diagram of a process 70 that the DSP block 26 may perform, for example, on data the DSP block 26 receives to determine the product of the inputted data. Additionally, it should be noted the operations described with respect to the process 70 are discussed in greater detail with respect to subsequent drawings.

At process block 72, the DSP block 26 receives data. The data may include values that will be multiplied. The data may include fixed-point and floating-point data types. In some embodiments, the data may be fixed-point data types that share a common exponent. Additionally, the data may be floating-point values that have been converted for fixed-point values (e.g., fixed-point values that share a common exponent). As described in more detail below with regard to circuitry included in the DSP block 26, the inputs may include data that will be stored in weight registers included in the DSP block 26 as well as values that are going to be multiplied by the values stored in the weight registers.

At process block 74, the DSP block 26 may multiply the received data (e.g., a portion of the data) to generate products. For example, the products may be subset products (e.g., products determined as part of determining one or more partial products in a matrix multiplication operation) associated with several columns of data being multiplied by data that the DSP block 26 receives. For instance, when multiplying matrices, values of a row of a matrix may be multiplied by values of a column of another matrix to generate the subset products.

At process block 76, the DSP block 26 may compress the products to generate vectors. For example, as described in more detail below, several stages of compression may be used to generate vectors that the DSP block 26 sums.

At process block 78, the DSP block 26 may determine the sums of the compressed data. For example, for subset products of a column of data that have been compressed (e.g., into fewer vectors than there were subset products), the sum of the subset products may be determined using adding circuitry (e.g., one or more adders, accumulators, etc.) of the DSP block 26. Sums may be determined for each column (or row) of data, which as discussed below, correspond to columns (and rows) of registers within the DSP block 26. Additionally, it should be noted that, in some embodiments, the DSP block 26 may convert fixed-point values to floating-point values before determining the sums at process block 78.

At process block 80, the DSP block 26 may output the determined sums. As discussed below, in some embodiments, the outputs may be provided to another DSP block 26 that is chained to the DSP block 26.

Figure 4:
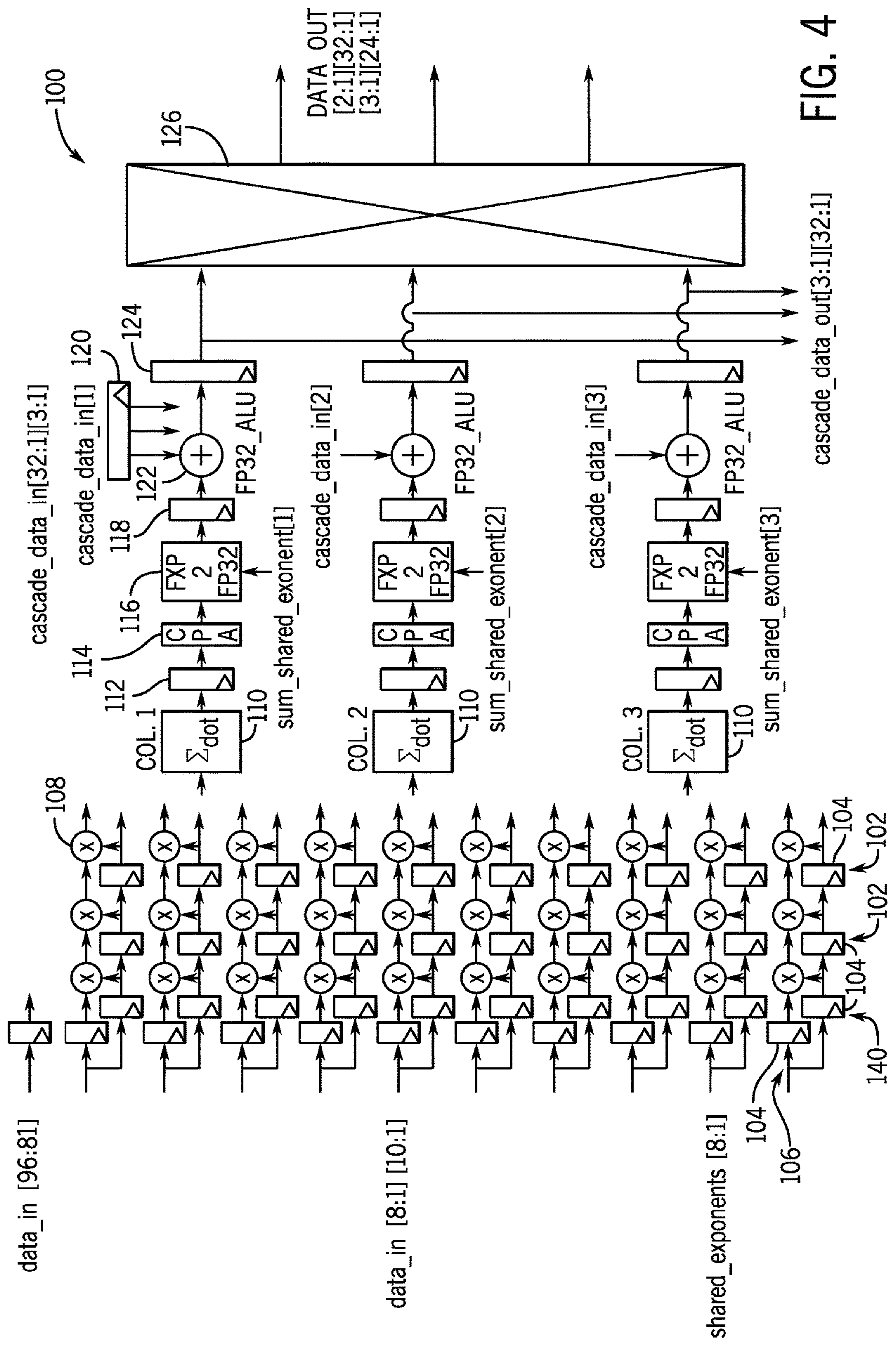
FIG. 4 is a block diagram of a virtual bandwidth expansion structure implementable via the DSP block of FIG. 1, in accordance with an embodiment of the present disclosure.

Keeping the discussion of FIG. 3 in mind, FIG. 4 is a block diagram illustrating a virtual bandwidth expansion structure 100 implemented using the DSP block 26. The virtual bandwidth expansion structure 100 includes columns 102 of registers 104 that may store data values the DSP block 26 receives. For example, the data received may be fixed-point values, such as four-bit or eight-bit integer values. In other embodiments, the received data may be fixed-point values having one to eight integer bits, or more than eight integer bits. Additionally, the data received may include a shared exponent in which case the received data may be considered as floating-point values. While three columns 102 are illustrated, in other embodiments, there may be fewer than three columns 102 or more than three columns 102. The registers 104 of the columns 102 may be used to store data values associated with a particular portion of data received by the DSP block 26. For example, each column 102 may include data corresponding to a particular column of a matrix when performing matrix multiplication operations. As discussed in more detail below, data may be preloaded into the columns 102, and the data can be used to perform multiple multiplication operations simultaneously. For example, data received by the DSP block 26 corresponding to rows 106 (e.g., registers 104) may be multiplied (using multipliers 108) by values stored in the columns 102. More specifically, in the illustrated embodiment, ten rows of data can be received and simultaneously multiplied with data in three columns 102, signifying that thirty products (e.g., subset products) can be calculated. In certain embodiments, one of the three columns 102, may function as a configurable column 140 that will be discussed in more detail below. The configurable column 140 may enable expanded DSP functionalities (e.g., operations involving relative higher precision values such as FP32 values or fixed-point values having more bits than eight-bit integer (INT8) values), and perform multiplications that enable large number integers and floating-point numbers to be output from the configurable column 140 operations and further processing.

For example, when performing matrix-matrix multiplication, the same row(s) or column(s) is/are may be applied to multiple vectors of the other dimension by multiplying received data values by data values stored in the registers 104 of the columns 102. That is, multiple vectors of one of the dimensions of a matrix can be preloaded (e.g., stored in the registers 104 of the columns 102), and vectors from the other dimension are streamed through the DSP block 26 to be multiplied with the preloaded values. Accordingly, in the illustrated embodiment that has three columns 102, up to three independent dot products can be determined simultaneously for each input (e.g., each row 106 of data). As discussed below, these features may be utilized to multiply generally large values. Additionally, as noted above, the DSP block 26 may also receive data (e.g., 8 bits of data) for the shared exponent of the data being received.

The partial products for each column 102 may be compressed, as indicated by the compression blocks 110 to generate one or more vectors (e.g., represented by registers 112), which can be added via carry-propagate adders 114 to generate one or more values. Fixed-point to floating-point conversion circuitry 116 may convert the values to a floating-point format, such as a single-precision floating point value (e.g., FP32) as provided by IEEE Standard 754, to generate a floating-point value (represented by register 118).

The DSP block 26 may be communicatively coupled to other DSP blocks 26 such that the DSP block 26 may receive data from, and provide data to, other DSP blocks 26. For example, the DSP block 26 may receive data from another DSP block 26, as indicated by cascade register 120, which may include data that will be added (e.g., via adder 122) to generate a value (represented by register 124). Values may be provided to a multiplexer selection circuitry 126, which selects values, or subsets of values, to be output out of the DSP block 26 (e.g., to circuitry that may determine a sum for each column 102 of data based on the received data values.) The outputs of the multiplexer selection circuitry 126 may be floating-point values, such as FP32 values or floating-point values in other formats such as bfloat24 format (e.g., a value having one sign bit, eight exponent bits, and sixteen implicit (fifteen explicit) mantissa bits).

As discussed above, it may be beneficial for a DSP block of an FPGA that extends AI tensor processing to also enable performance of DSP operations. This may include the ability of the DSP block to perform INT16 value FIR filtering operations and complex number operations, as well as performing multiplication and addition operations involving single precision (e.g., FP32) values. The ability for the DSP block 26 to configure for AI functionality as well as traditional DSP functionality for arithmetic operations reduces the need for excess hardware logic to perform DSP operations (e.g., programmable execution units such as arithmetic logic units (ALUs) or adaptive logic modules (ALMs)).

Figure 5:
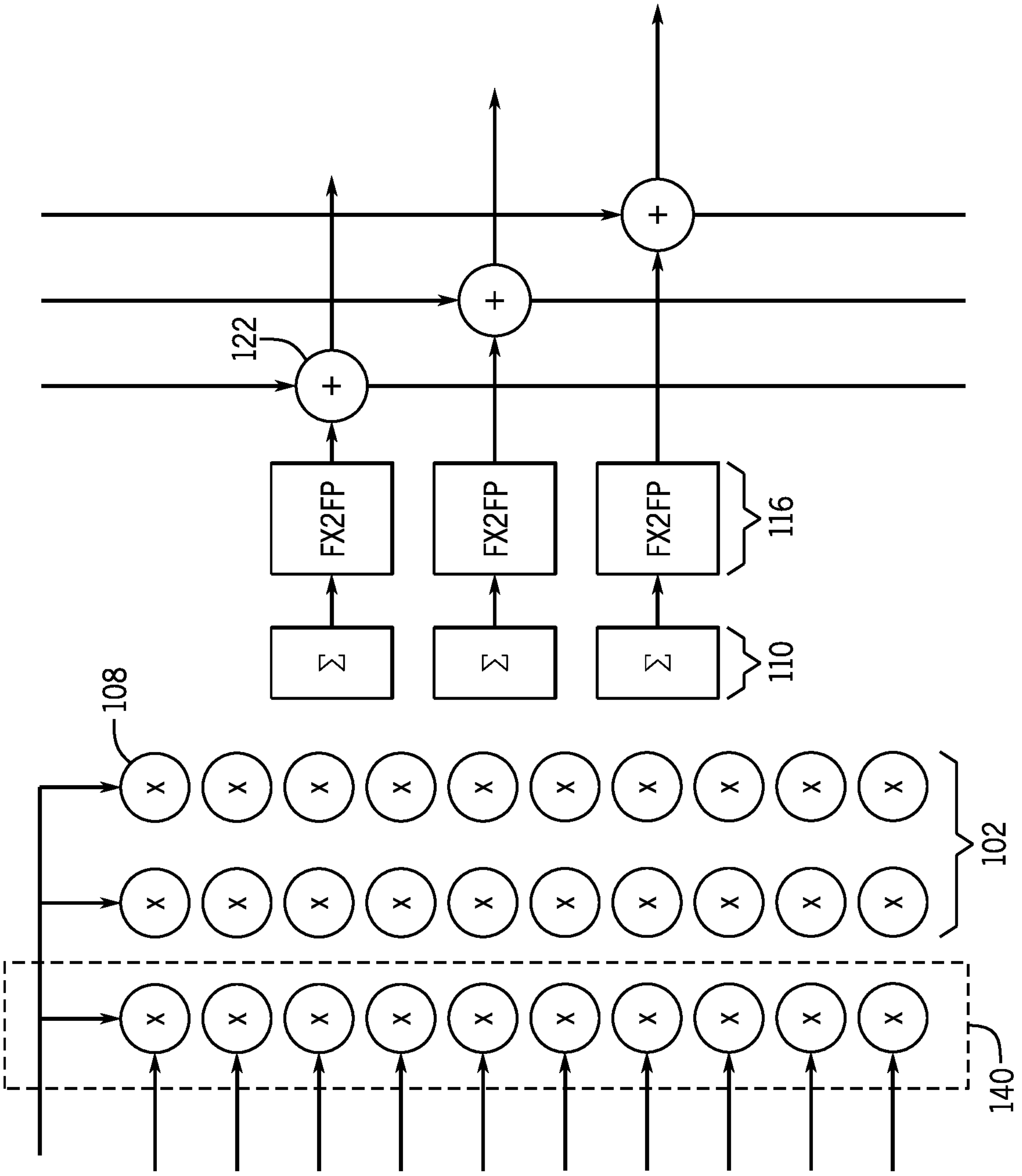
FIG. 5 is a block diagram of a DSP block with a configurable column for performing DSP operations, in accordance with an embodiment of the present disclosure.

With the foregoing in mind, FIG. 5 is a block diagram of the DSP block 26 architecture that includes a configurable column 140 configurable to perform both DSP operations (e.g., operations involving relatively higher precision values such as FP32 values) and machine learning operations (e.g., operations involving relatively lower precision values such as INT8 values).

As discussed above in FIG. 4, the DSP block 26 may include columns 102 of registers 104 that may store data values the DSP block 26 receives. For example, the data received may be fixed-point values, such as four-bit or eight-bit integer values. In other embodiments, the received data may be fixed-point values having one to eight integer bits, or more than eight integer bits. Additionally, the data received may include a shared exponent in which case the received data may be considered as floating-point values.

Further, each column 102 may include data corresponding to a particular column of a matrix when performing matrix multiplication operations. The data may preload into the columns 102, and the data may be used to perform multiple multiplication operations simultaneously. For example, data received by the DSP block 26 may be multiplied (using multipliers 108) by values stored in the columns 102. More specifically, in the illustrated embodiment, ten rows of data can be received and simultaneously multiplied with data in three columns 102, signifying that thirty products (e.g., subset products) can be calculated.

The DSP block 26 may include a configurable column 140 that is configurable to perform DSP functionalities, by converting the received data, such as INT16 values or FP32 values, into values having fewer bits (e.g., low precision values), performing multiplication operations involving the values that have fewer bits, and generating a relatively higher precision value (e.g., an INT16 or FP32 value) by combining the products from the multiplication operations (e.g., via adders, compressors, or both). As such, the DSP block 26 may utilize existing functionality to perform operations associated with machine learning applications while also supporting DSP operations. Accordingly, the DSP block 26 is not specific to performing operations typically associated with machine learning or AI applications because the configurable column 140 enables the DSP block 26 to perform DSP functions with the same density as a traditional FPGA DSP block while also supporting operations associated with machine learning applications.

As mentioned above, the DSP block 26 includes the configurable column 140 that enables DSP functionality including, but not limited to, INT16 value FIR filtering and FP32 value multiplication and addition/accumulation operations. While three columns 102, 140 are illustrated, in other embodiments, there may be fewer than three columns or more than three columns. The registers 104 of the columns 102, 140 may be used to store data values associated with a particular portion of data received by the DSP block 26. The configurable column 140 may be included in the three columns 102, 140 or be an additional column. The columns 102,140 function to output a dot product (e.g., scalar product) of the data received, the dot product output may be compressed and converted to a vector format by the compression block 110. The dot product output may be a 32-bit signed integer (e.g., INT32), and may be converted to FP32 value if desired via fixed-point to floating-point conversion circuitry 116. The output of the columns 102, 140 may be added using adders 122 (e.g., cascaded from and/or to adjacent blocks), and output to a general purpose routing component, or accumulated in a storage element.

The data received by the configurable column 140 may take the form of any of the data mentioned above that is received at each multiplier 108 of the configurable column 140. The data may include four-bit or eight-bit integer values, or any other suitable integer value, which may have been generated from a relatively larger integer value (e.g., an INT16 value) or a floating-point value that has a mantissa with a higher number of bits (e.g., an FP32 value). One dimension of values may be preloaded into each multiplier 108 of the configurable column 140, and the values corresponding to the other dimension (e.g., orthogonal) may be streamed through the DSP block 26. The multipliers 108 may be relatively small precision multipliers, such as 8-bit multipliers or 9-bit multipliers (e.g., multipliers that multiply two INT8 values or two INT9 values, respectfully), or any other suitable size.

Figure 6:
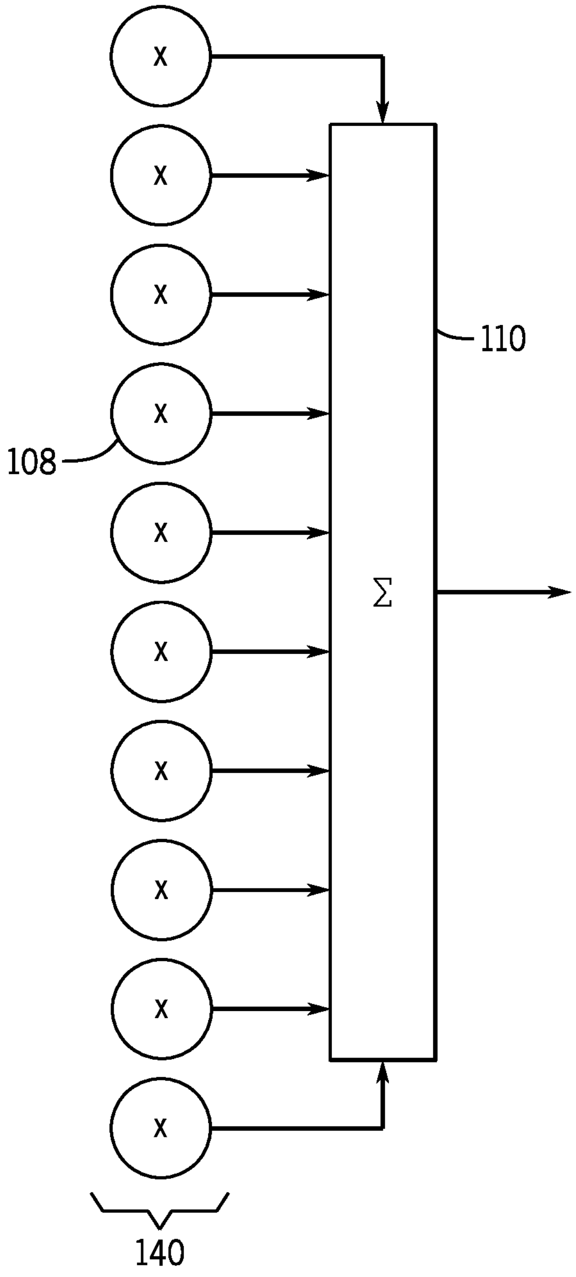
FIG. 6 is a block diagram of the configurable column of FIG. 5, in accordance with an embodiment of the present disclosure.

With the forgoing in mind, FIG. 6 is a block diagram of the configurable column of FIG. 5 configured for AI mode operations, in accordance with embodiments of the present disclosure. As discussed above, the configurable column 140 may function to perform AI tensor block operations in additional to traditional DSP functionalities. In the AI tensor mode, the DSP block 26 may enable the configurable column 140 to receive a number of values of relatively low precision to be multiplied (e.g., ten INT4 or INT8 values). The values may be fed into the DSP block 26 according to the techniques discussed above with regard to loading the data into the registers 104 of the configurable column 140. Additional values may be streamlined into the multipliers 108 while values from the registers 104 to generate products (e.g., partial products) that may be utilized for a variety of applications. For example, in the functional AI mode, the configurable column 140 and additional columns 102 may function to perform encryption, decryption, machine learning, video processing, voice recognition, image recognition, data compression, database search ranking, bioinformatics, network security pattern identification, spatial navigation, digital signal processing, or some other specialized task. In the AI tensor mode, the compression block 110 may sum each of the products generated by the multipliers without shifting (e.g., left-shifting or right-shifting) any of the products. As discussed below, while operating in another mode (e.g., a DSP mode), products generated by multipliers included in the DSP block 26 may be shifted (e.g., to account for the values having different significances), and adder circuitry (e.g., compressor circuitry, adders, or both) may sum the shifted products.

As discussed above, in some instances traditional DSP functionalities involving INT16 values and FP32 value multiplications may be desired to be performed using the DSP block 26. The ability for a column of the DSP block to be reconfigured from AI tensor mode to a DSP functionality (e.g., DSP mode) may be enable the integrated circuit device 12 to perform DSP operations without utilizing soft logic (e.g., programmable logic 48) included in the integrated circuit device 12. Accordingly, configuring the configurable column 140 of the DSP block 26 to operate in DSP mode may reduce the amount of processing power utilized for operations and reduce the amount of programmable logic 48 (e.g., number of ALUs) that would be used to complete operations associated with DSP functionalities if the DSP block 26 were configured in AI tensor mode but performing operations involving INT16 or FP32 values (or values derived therefrom).

Figure 7:
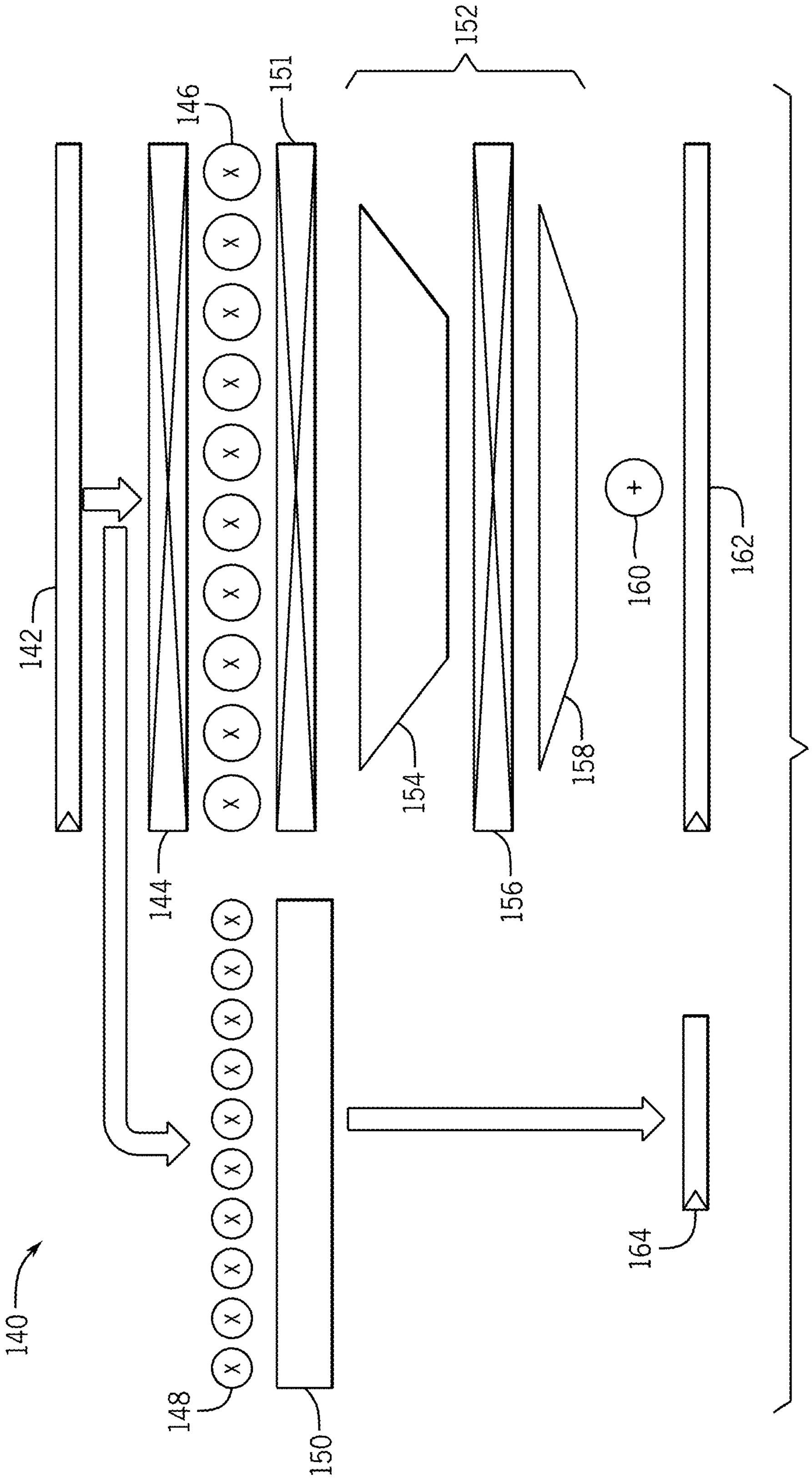
FIG. 7 is a block diagram of the hardware circuitry of the configurable column of FIG. 5, in accordance with an embodiment of the present disclosure.

With the foregoing in mind, FIG. 7 is a block diagram the configurable column 140 of FIG. 5. As illustrated, the configurable column 140 includes a register block 142, a multiplexer network 144, multipliers 146, multipliers 148, compressor circuitry 150, a multiplexer network 151, compressor circuitry 152 (which includes compressor circuitry 154, a multiplexer network 156, and compressor circuitry 158), an adder 160, and register blocks 162, 164. As discussed below, values of a first size (e.g., INT16 values, FP32 values) may be converted into values of a smaller size (e.g., INT8 values, INT9 values), multiplication operations may be performed involving the values of a smaller size to generate products, and the products may be combined to generate a value of the original size (e.g., an INT 16 value or FP32 value that is respectively the product of an INT16×INT16 multiplication operation or an FP32×FP32 multiplication operation). Furthermore, as also discussed below, the configurable column 140 may also be utilized to perform multiplication involving relatively small values (e.g., INT4 values). Accordingly, the configurable column 140 may be utilized to both DSP and AI applications.

The register block 142 may store values to be operated on by the DSP block 26 as well as values derived therefrom. For example, the register block 142 may store INT8 values received by the DSP block as well as INT8 or other values (e.g., fixed-point values) that are derived from values to be operated on (e.g., multiplied) by the DSP block 26, such INT16 or FP32 values.

Additionally, the multiplexer network 144 may receive data (e.g., values) from the register block 142 and route the values to the multipliers 146, 148 (e.g., based on a particular application the DSP block 26 is being utilized to perform). For example, the multiplexer network 144 may arrange received values according to bit location and desired value format. More specifically, the multiplexer network 144 may include multiplexers and crossbars that may align received the integer data values in multiple configurations depending on the hardware elements present and/or functionality desired. Furthermore, in some embodiments, the multiplexer network 144 may generate integer values from received values and route the generated values to the multipliers 146 (and multipliers 148). In such embodiments, the multiplexer network 144 may generate integer values from floating-point values (e.g., from mantissa (also known as significand) bits, larger integer values (e.g., generating INT8 from INT16 values), or both. As such, the multiplexer network 144 may route values to be multiplied to particular multipliers 146 (and multipliers 148), for instance, based on a desired functionality of the DSP block 26. In other embodiments, the multiplexer network may route values generated from other values (e.g., INT4, INT8, or INT9 values generated from higher precision values such as INT16 values or mantissa bits of FP32 values) to the multipliers 146 (and multipliers 148). In such embodiments, each of the lower precision values may be stored in a register included in the register block 142. The multiplexer network 144 may receive the values from the register of the register block 142, and route the values to the multipliers 146 (and multipliers 148). In some cases, a value stored in a single register may be routed to multiple multipliers (e.g., two or three of the multipliers 146).

More specifically, when performing multiplication operations involving INT16 and FP32 values, integer values generated from the INT16 and FP32 values (e.g., INT8 values) the multiplexer network 144 may route the generated values to the multipliers 146. The multipliers 146, which may be INT9 multipliers, may output products which are later added together to generate the product of the two initial inputs (e.g., an INT16 value as a result of an INT16×INT16 multiplication operation or an FP32 value as a result of performing an FP32×FP32 multiplication operation). Additionally, the values sent to the multipliers 146 may be signed, and the most significant bit (MSB) of the values sent to the multipliers 146 may be zeroed in cases where unsigned components of larger multipliers are to be used in further calculations. The multipliers 146 may also enable multiple implementations such as Radix-4 or Radix-8 Booth encoding.

However, when operating on lower precision values (e.g., INT4 values), such as when the DSP block 26 may be used for AI applications, the multiplexer network 144 may route the values to the multipliers 148 in addition to the multipliers 146. The multipliers 148, which may be INT4 multipliers, and the multipliers 146 may perform INT4×INT4 multiplication operations. In other words, when operating using INT4 inputs, the multipliers 146 function as INT4 multipliers. More specifically, the INT4 value may be input into a multiplier 148, and the sign can be extended to fit the multiplier 148. Additionally, the INT4 values may be input to upper bits may be received by the multipliers 146, and the lower bits may be zeroed. In this way the larger multipliers 146 may function to enable multiplication for corresponding smaller bit values (e.g., INT4). Accordingly, the DSP block 26 provides INT4 tensor support for smaller IT4 values.

Products generated by the multipliers 148 may be summed using compressor circuitry 150, which may include any suitable adder or compressor circuitry for adding the products. A sum generated by the compressor circuitry 150 by adding products generated by the multipliers 148 may be stored in the register block 164 and output by the DSP block 26 (or utilized for further calculations by the DSP block 26).

Before continuing with the discussion of FIG. 7, it should be noted that while ten multipliers 146 and ten multipliers 148 are illustrated in FIG. 7, the configurable column 140 may include a different number of either or both of the multipliers 146, 148 in other embodiments. Additionally, while the multipliers 146 and multipliers 148 are discussed above a respectively being INT9 and INT4 multipliers, other size multipliers may be used in other embodiments. Furthermore, it should be noted that the multipliers 146 may be the multipliers 108 discussed above. Accordingly, the multipliers 108 discussed above may be INT9 multipliers.

The multiplexer network 151 receives the values (e.g., products) output from the multipliers 146 and routes the values to the compressor circuitry 152. Similar to the multiplexer network 144, the multiplexer network 151 may include multiplexers, crossbars, or other circuitry that can perform such routing, which is discussed below in more detail. The compressor circuitry 152 may reduce the number of outputs (e.g., products) generated by the multipliers 146 to two values (e.g., vectors) that can be added by the adder 160. As discussed with respect to FIG. 11, the compressor circuitry 154 may generate five outputs from up to ten received values, the multiplexer network 156 may route the outputs to the compressor circuitry 158, and the compressor circuitry 158 may generate two outputs (e.g., vectors) that are received and added by the adder 160. The adder 160 may be any suitable adding circuitry, such as adder circuitry capable of adding 16-bit or 24-bit values.

Figure 8:
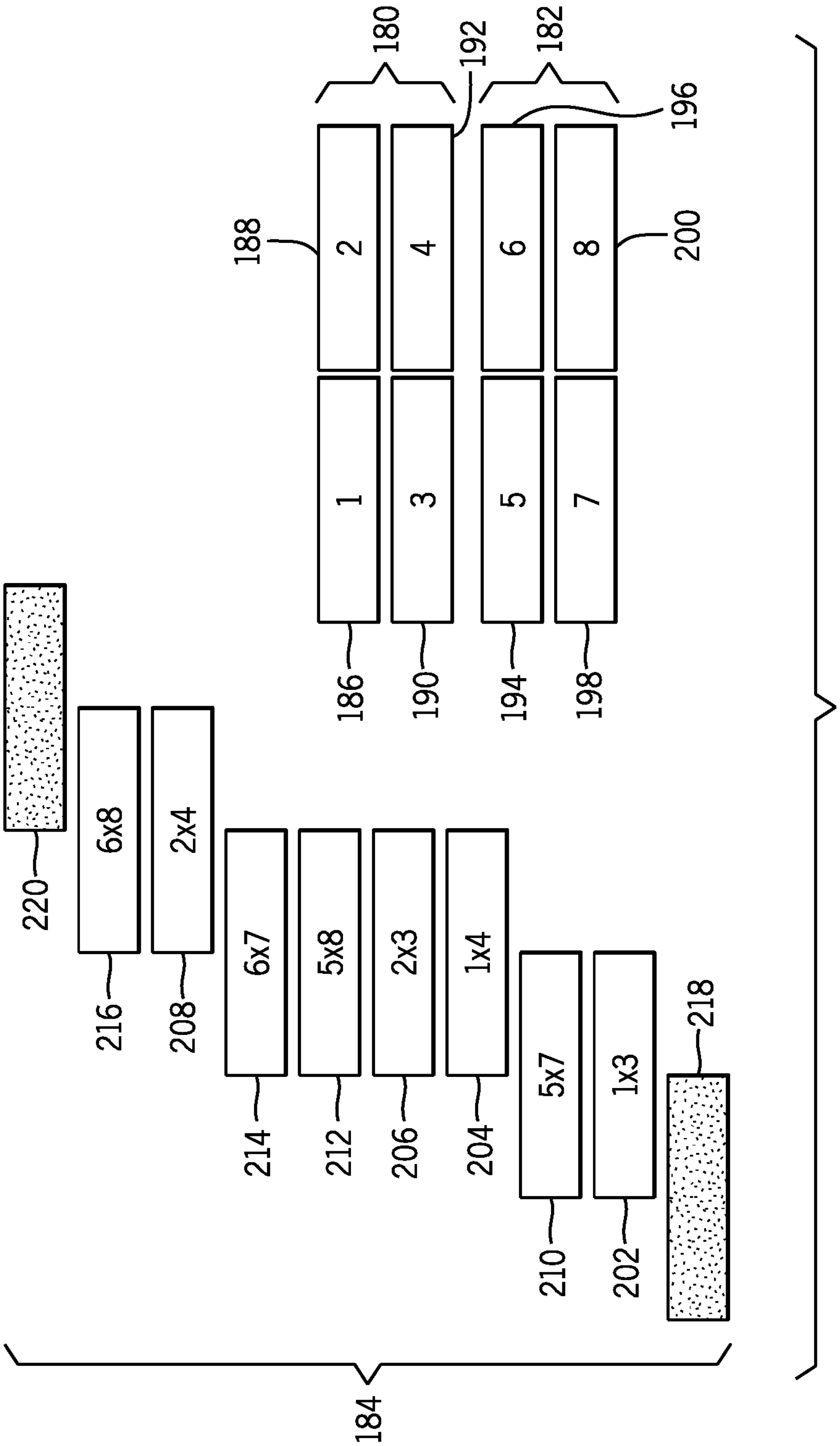
FIG. 8 illustrates an arrangement of multiplication operations for the output of the multipliers of FIG. 7, in accordance with an embodiment of the present disclosure.

Keeping the foregoing in mind, FIG. 8 illustrates values representative of two INT16×INT16 multiplication operations 180, 182 that may be performed by the multipliers 146 as well as subproducts 184 generated by the multipliers 146. As noted above, the multipliers 146 may be INT9 multipliers, and the outputs can be used to support INT16 values. This arrangement can enable smaller integers (e.g. INT8) to be combined into larger integers (e.g., INT16) that can be used for DSP applications, such as FIR filtering.

More specifically, multiplication operation 180 involves four eight-bit values (e.g., values 186, 188, 190, 192) generated from two INT16 values, and multiplication operation involves four eight-bit values (e.g., values 194, 196, 198, 200) generated from two INT16 values. For example, values 186, 190, 194, 198 may be the upper halves (e.g., eight most significant bits) of INT16 values, and the values 188, 192, 196, 200 may be the lower halves (eight least significant bits) of the INT16 values, with values 186, 188 being derived from a first INT16 value, values 190, 192 being derived from a second INT16 value, values 194, 196 being derived from a third INT16 values, and value 198, 200 being derived from a fourth INT16 value.

In the first multiplication operation 180, the value 186 is multiplied by the values 190, 192 to generate subproducts 202, 204, respectively. Additionally, the value 188 is multiplied by the values 190, 192 to generate subproducts 206, 208, respectively. In the second multiplication operation 182, the value 194 is multiplied by the values 198, 200 to generate subproducts 210, 212, respectively. Additionally, the value 196 is multiplied by the values 214, 216 to generate subproducts 206, 208, respectively. Each of these multiplication operations be a signed integer multiplied by a singed integer, an unsigned integer multiplied by a signed integer, or an unsigned integer multiplied by another unsigned integer. For example, a signed INT8 value (e.g., a value ranging from −128 to 127, inclusive) may be multiplied by another signed INT8 value without modifying either value, and an unsigned INT8 value (e.g., a value ranging from 0 to 255, inclusive) can be multiplied by another unsigned INT8 value without modifying either value. For multiplication between a signed INT8 value and an unsigned INT8 value (e.g., when multiplying an upper half of an INT16 value by a lower half of an INT16 value), an unsigned input may be created by adding a zero into the most significant bit position of an input, and a signed value may be created by adding a one into the most significant bit position of an input.

As illustrated, the significance of the subproducts generated by the multipliers 146 may be taken into account. For example, the DSP block 26 (e.g., via the multiplexer network 151) may left-shift the subproducts 202, 210 by sixteen bits (because both a generated from multiplication operations involving the upper halves of values) and left-shift the subproducts 204, 206, 212, 214 by eight bits (because each is generated from a multiplication operation involving an upper half of an INT16 value and a lower half of an INT16 value).

Accordingly, the DSP block 26 may perform multiple INT16×INT16 multiplication operations, thereby providing support for DSP functionalities including, but not limited to, FIR filters and fast Fourier transform (FFT) operations. As discussed above, the individual multiplications may be aligned according to the offsets described above, this enables the subproducts 184 from two INT16×INT16 multiplication operations to be added together at the correct bit placements. Additionally, subproduct 218 (e.g., a subproduct generated by multiplying value 186 by value 188) and subproduct 220 (e.g., a subproduct generated by multiplying value 194 by value 196) may not be utilized by the DSP block 26 and may be zeroed by the multiplexer network 151. Furthermore, as discussed below with respect to FIG. 11, the subproducts 184 as arranged in FIG. 8 may be sent (via the multiplexer network 151) to the compressor circuitry 152, which may compress the subproducts (e.g., partial products) into vectors.

A similar alignment pattern may be utilized to calculate the mantissa multiplier for a FP32×FP32 multiplication operations. This enables the same multiplexer pattern (e.g., in the multiplexer networks 144, 151, 156) to be used for the calculating the sum of INT16 multiplications and calculating the mantissa bits for FP32 values. This enables the data path length for the received integer data to be reduced and improves data flow efficiency. The similar arrangement also enables the same compression groups to be implemented in the data path hardware. This enables the INT16 and FP32 multipliers to use similar hardware logic and dataflow, which optimizes the hardware logic arrangements and dataflow processing.

Figure 9:
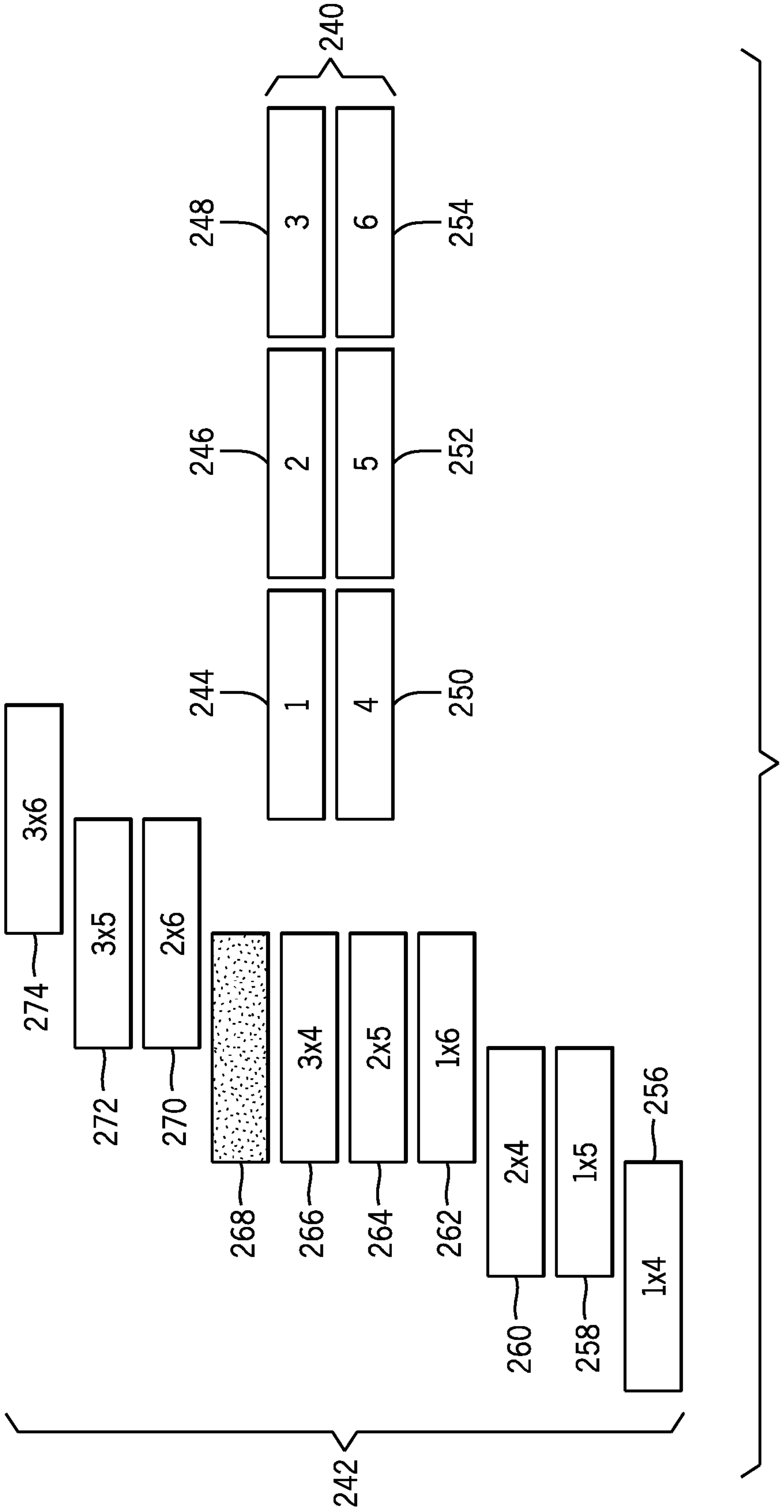
FIG. 9 illustrates an additional arrangement of multiplication operations for the output of the multipliers of FIG. 7, in accordance with an embodiment of the present disclosure.

With the foregoing in mind, FIG. 9 illustrates a multiplication operation 240 and subproducts 242 (e.g., partial products) generated from performing the multiplication operation 240. In particular, the multiplication operation 202 may be an FP32×FP32 multiplication involving the mantissa bits of two FP32 values that is performed using the configurable column 140. That is, the configurable column 140 may be used to perform multiplication operations that may otherwise be performed using a 24×24 bit multiplier. For instance, to perform the multiplication operation 240, the mantissa bits of first FP32 value may be included in value 244, value 246, and value 248, and the mantissa bits of a second FP32 value may be included in value 250, value 252, and value 254. More specifically, values 244 and 250 may include “01” followed by the seven most significant mantissa bits (e.g., bit 23 to bit 17), and values 246, 248, 252, 254 may include a “0” followed by eight other mantissa bits, thereby functioning as unsigned operands.

The values 244, 246, 248, 250, 252, 254 may be routed by the multiplexer network 144 to the multipliers 146 to generate the subproducts 242, which may include subproduct 256 (generated by multiplying value 244 and value 250), subproduct 258 (generated by multiplying value 244 and value 252), 260 (generated by multiplying value 246 and value 250), subproduct 262 (generated by multiplying value 244 and value 254), subproduct 264 (generated by multiplying value 246 and value 252), subproduct 266 (generated by multiplying value 248 and value 250), subproduct 268 (generated by multiplying two values derived from the same FP32 value), 270 (generated by multiplying value 246 and value 254), subproduct 272 (generated by multiplying value 248 and value 252), and subproduct 274 (generated by multiplying value 248 and value 254). The significance of the subproducts 242 may be taken into account by the multiplexer network 151, which may arrange the subproducts 242 in the manner illustrated in FIG. 9 to be provided the compressor circuitry 152. More specifically, subproducts 270, 272 may be left-shifted by eight bits (e.g., relative to subproduct 274), subproducts 262, 264, 266, 268 may be left-shifted by sixteen bits, subproducts 258, 260 may be left-shifted by twenty-four bits, and subproduct 256 may be left-shifted by thirty-two bits. Additionally, subproduct 268 may be zeroed.

As noted above, the arrangement of the operands into the multipliers 146 is facilitated by the multiplexer matrix 141. In some arrangements, the indexes for the data are shared between two mapping locations on a rank basis to simplify the data mapping by the multiplexer matrix 141. This may mitigate the use for a 1:1 mapping ratio between the operands and the input pin indexes, therefore enabling multiple arrangements of input components on the DSP block 26. In other words, the operands (e.g., values 244, 246, 248, 250, 252, 254) may be routed to different multipliers 146 without the two values associated with a particular multiplication operation having to be assigned to any one particular multiplier 146.

Figure 10:
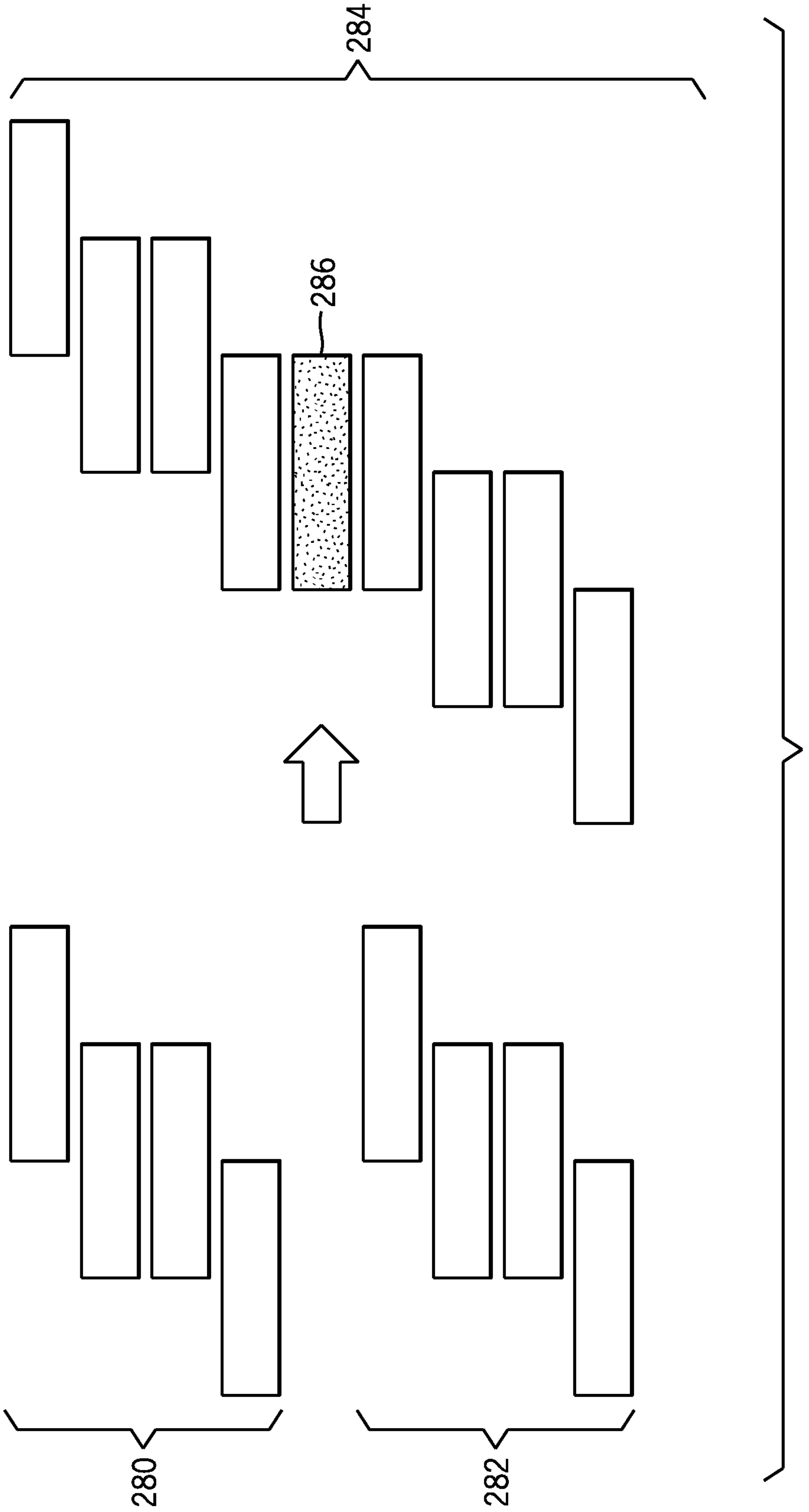
FIG. 10 illustrates a further arrangement of multiplication operations for the output of the multipliers of FIG. 7, in accordance with an embodiment of the present disclosure.

While FIG. 8 and FIG. 9 show two examples of alignments of subproducts (e.g., partial products), it should be noted that other arrangements may be used. For example, in FIG. 10, subproducts 280 and subproducts 282 may be each be generated from performing a corresponding INT16×INT16 multiplication operation. The subproducts 280 and subproducts 282 may be added independently of one another or, as indicated by subproducts 284, arranged and added together (e.g., to generate an FP32 value). In such a case, a partial product 286 may be inserted into the assembled subproducts 280, 282 to generate the mantissa multiplier for the subproducts 284.

Figure 11:
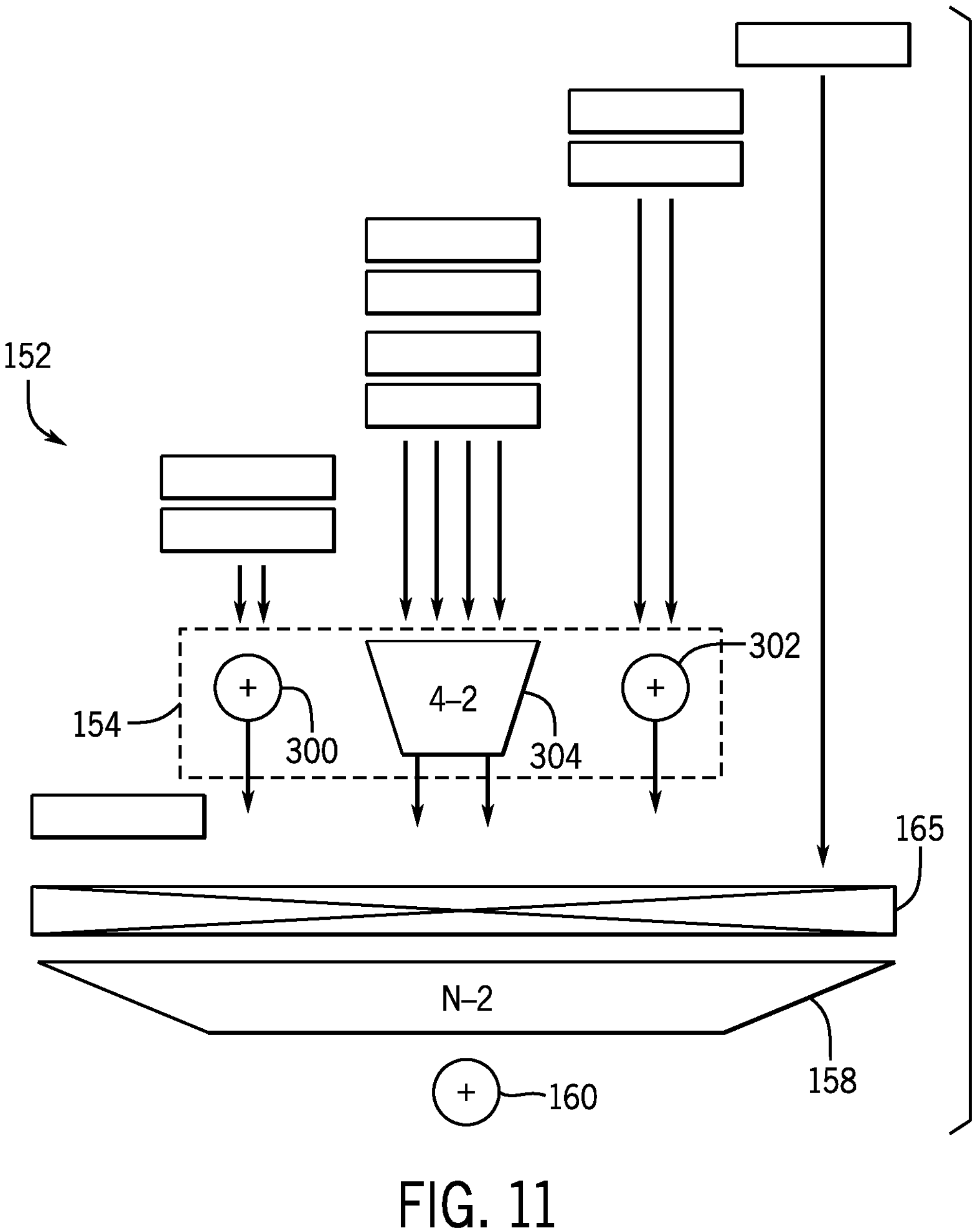
FIG. 11 illustrates partial product compression corresponding to the multiplier output of FIG. 7, in accordance with an embodiment of the present disclosure.

Continuing with the drawings, FIG. 11 illustrates the compressor circuitry 152 receiving data (e.g., subproducts or partial products) as arranged by the multiplexer network 151. As illustrated, up to ten inputs may be received, and some may be added using adders 300, 302 (e.g., carry-propagate adders), while others may be compressed using compressor circuitry 304, which may be a 4-2 compressor that receives up to four inputs and generates up to two outputs (e.g., a sum vector and a carry vector). Accordingly, the up to ten inputs provided by the multiplexer network 151 may be reduced to up to six vectors. The multiplexer network 156 may receive the up to six vectors and route the up to six vectors the compressor circuitry 158, which outputs two vectors that are summed by the adder 160.

Figure 12:
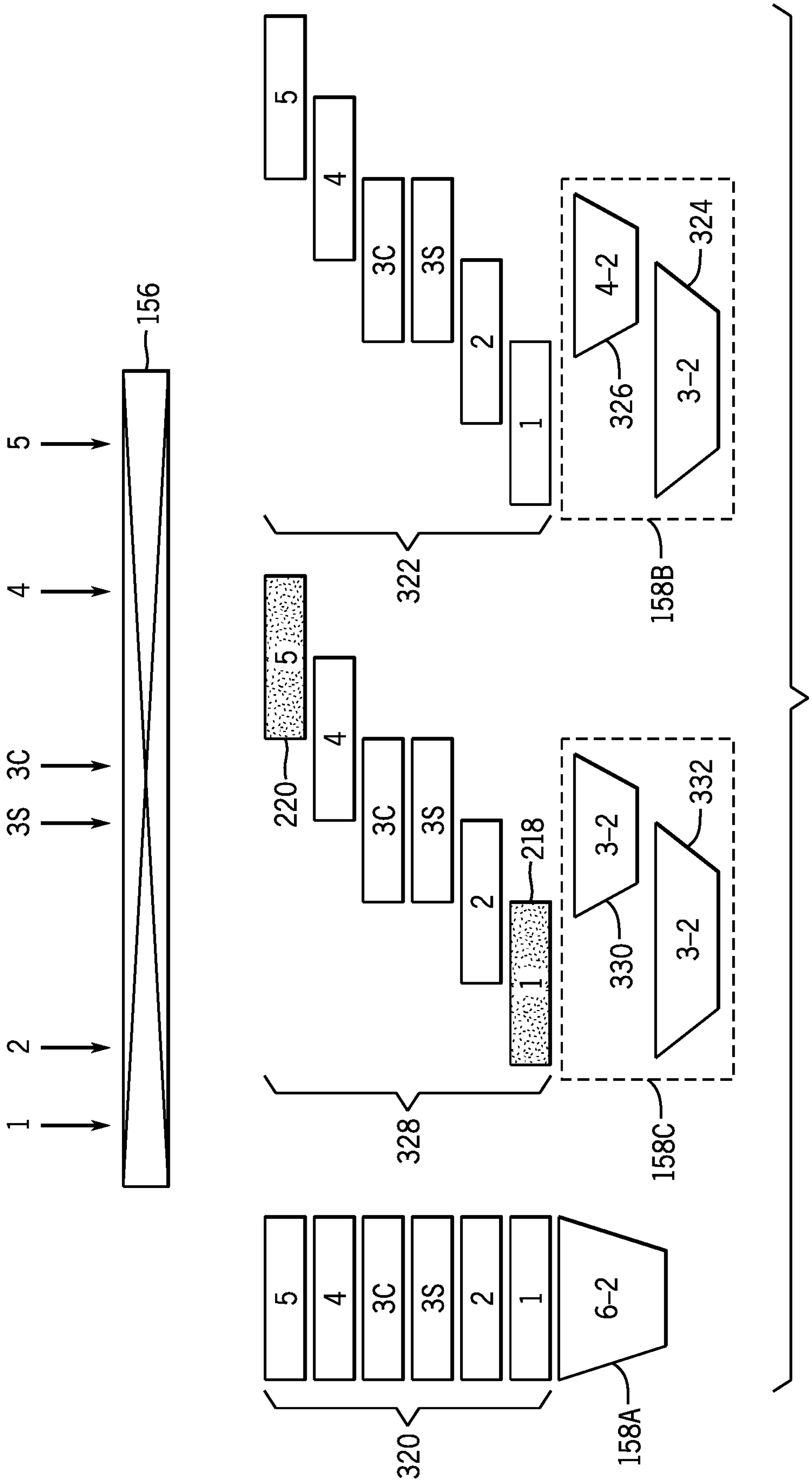
FIG. 12 illustrates vector compression architecture corresponding to the multiplier output of FIG. 7, in accordance with an embodiment of the present disclosure.

Turning to FIG. 12, the multiplexer network 156 may implement different vector arrangements according to a desired compression pattern, and the compressor circuitry 158 may include different circuitry to compress vectors received from the multiplexer network 156. For example, in the case of FP32 mantissa arrangements, a single 6-2 compressor 158A may be implemented to compress vector output 320. As another example (also for an FP32 mantissa arrangement) a vector output 322 may be received by compressor circuitry 158B, which may include a 3-2 compressor 324 and a 4-2 compressor 326. In the case of the summation of INT16 multipliers, as depicted in the arrangement of FIG. 8, subproducts 218, 220 may be zeroed, and compressor circuitry 158C may compress the (partial) product 328 using two 3-2 compressors 330, 332. Furthermore, in each of these cases, the compressor circuitry 158 outputs two vectors that may be received and added by the adder 160 to determine the final sum of the compressed data. The output of the adder 160 may be sent to an additional register and then directed for further data processing.

Figure 13:
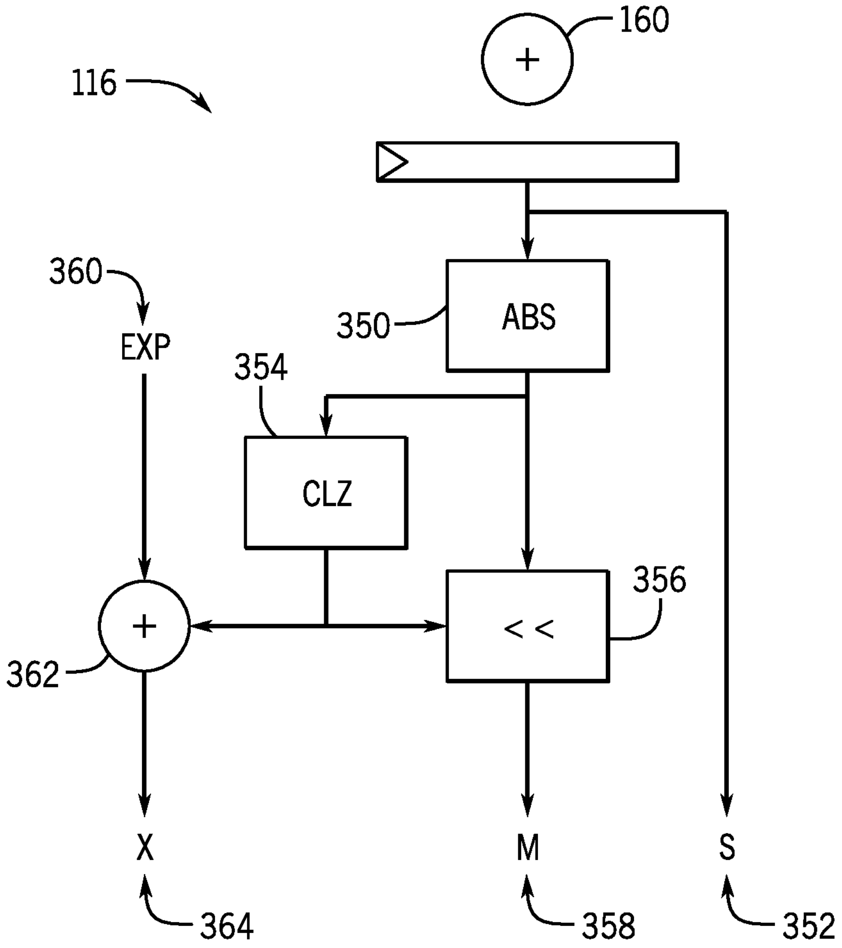
FIG. 13 illustrates an integer value to floating-point value conversion circuit, in accordance with an embodiment of the present disclosure.

With the foregoing in mind, FIG. 13 illustrates fixed-point to floating-point conversion circuitry 116, in accordance with an embodiment of the present disclosure. In some instances, the integer dot product of the multiplication may be processed and converted to a floating-point value. The fixed-point to floating-point conversion circuitry 116 may be implemented after the final dot product summation discussed in FIGS. 11 and 12. In other words, the fixed-point to floating-point conversion circuitry 116 may receive a sum generated by the adder 160.

The fixed-point to floating-point conversion circuitry 116 may receive an integer dot product value from the configurable column 140 and compressor circuitry 152 of the DSP block 26. The received integer dot product value may first be processed by an absolute value circuitry 350. The absolute value circuitry 350 functions in some cases to set a sign bit 352. For example, in the case of a negative integer, the sign bit would be set. The output of the absolute value circuit may be sent to count leading zeros (CLZ) circuitry 354 that may function to count the number of leading zeros of the absolute value product (i.e., the output of the absolute value circuitry 350). The CLZ circuitry 354 may send the number of leading zeros to left shift circuitry 356, which may cause the integer value may be shifted to align the 1 to the lowest significant bit for the integer and output the mantissa value 358 of the floating-point value. The value of the determined shift may be subtracted from an exponent value 360 calculated in the previous circuit stage (e.g., using adder 362), and the difference may be output 364, which may be the exponent bits of the floating-point output generated by the fixed-point to floating-point conversion circuitry 116. Therefore, the fixed-point to floating-point conversion circuitry 116 may function to convert integer values (e.g., integer dot products) to floating-point values.

Figure 14:
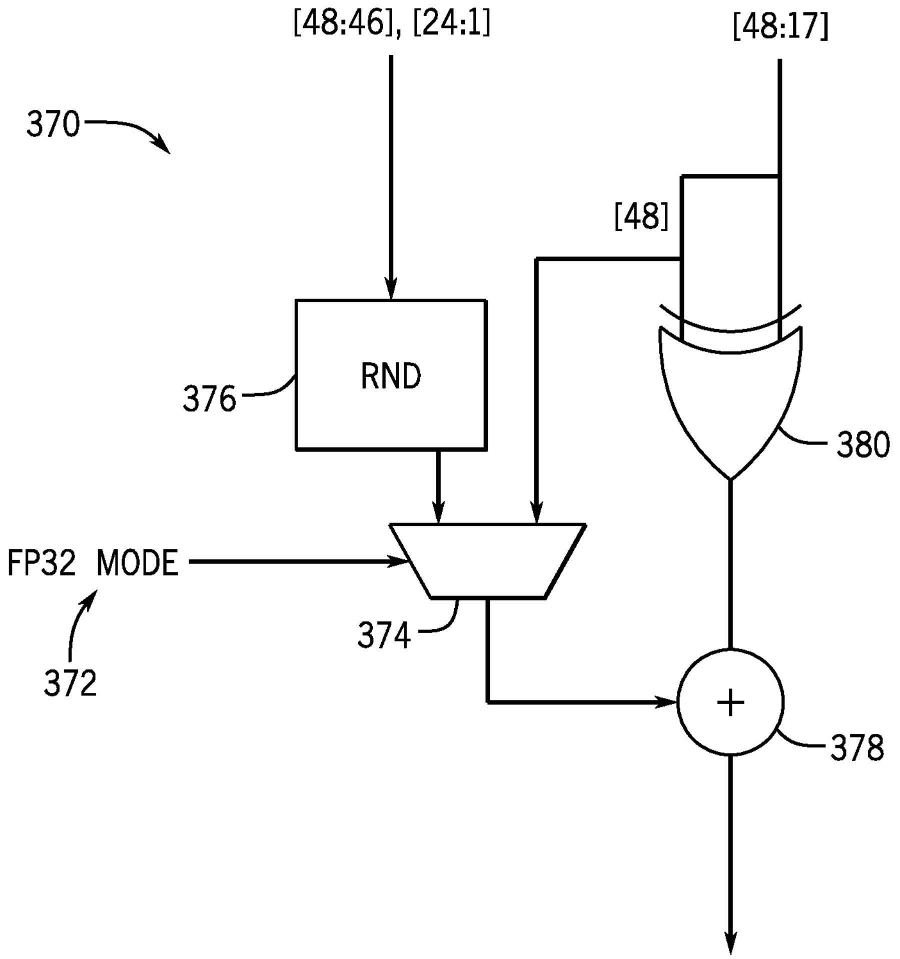
FIG. 14 illustrates a floating-point round circuit component of the integer value to floating-point value conversion circuit of FIG. 13, in accordance with an embodiment of the present disclosure.

Continuing with the drawings, FIG. 14 illustrates a floating-point round circuit 370 of the fixed-point to floating-point conversion circuitry 116 of FIG. 13, in accordance with an embodiment of the present disclosure. The floating-point round circuit 370 may be included as part of the fixed-point to floating-point conversion circuitry 116 to enable a rounding bit for an FP32 value to be calculated. More specifically, the floating-point round circuit 370 may be included in the absolute value circuitry 350.

The absolute value for the integer dot product may be calculated by inverting the integer value (e.g., 1's complement) if the most significant bit is high (e.g., a "1"), and then adding the most significant bit (e.g., 1's to 2's complement). When the floating-point round circuit 370 receives an FP32 mode signal 372 (e.g., at multiplexer 374), the integer value received will be positive, and the leading "1" will be located in the upper 3 bits of the integer. In the FP32 mode, the round bit may be added (e.g., by reusing the adder of the ABS circuit). The round bit may be calculated by a rounding block 376 using the upper three bits of the received integer value and the lower twenty-four bits of the integer value. For instance, the upper three bits of the received integer value and the lower twenty-four bits of the integer value may be input into the rounding block 376, which may determine if a rounding bit is needed for the conversion to a floating-point value. The output of the rounding block 376 may then be coupled to the multiplexer 374, which may provide an output to an adder 378 (e.g., based on the FP32 signal being present).

Additionally, the upper 32 bits and the most significant bit of the integer value are input to an exclusive OR (XOR) logic gate 380 that has an output coupled to the adder 378. The floating-point round circuit 370 may bypass the normalization operation (e.g., performed by CLZ circuitry 354 and the left shift circuitry 356). In this way, the floating point round circuit 370 may function as a part of the fixed-point to floating-point conversion circuitry 116 to convert dot product integers to floating-point values.

Figure 15:
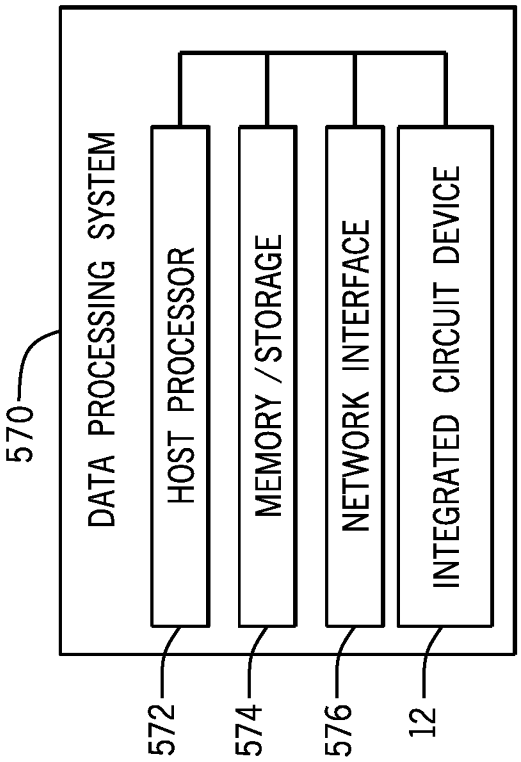
FIG. 15 is a data processing system, in accordance with an embodiment of the present disclosure.

In addition, the integrated circuit device 12 may be a data processing system or a component included in a data processing system. For example, the integrated circuit device 12 may be a component of a data processing system 570, shown in FIG. 15. The data processing system 570 may include a host processor 572 (e.g., a central-processing unit (CPU)), memory and/or storage circuitry 574, and a network interface 576. The data processing system 570 may include more or fewer components (e.g., electronic display, user interface structures, application specific integrated circuits (ASICs)). The host processor 572 may include any suitable processor, such as an INTEL® Xeon® processor or a reduced-instruction processor (e.g., a reduced instruction set computer (RISC), an Advanced RISC Machine (ARM) processor) that may manage a data processing request for the data processing system 570 (e.g., to perform encryption, decryption, machine learning, video processing, voice recognition, image recognition, data compression, database search ranking, bioinformatics, network security pattern identification, spatial navigation, or the like). The memory and/or storage circuitry 574 may include random access memory (RAM), read-only memory (ROM), one or more hard drives, flash memory, or the like. The memory and/or storage circuitry 574 may hold data to be processed by the data processing system 570. In some cases, the memory and/or storage circuitry 574 may also store configuration programs (bitstreams) for programming the integrated circuit device 12. The network interface 576 may allow the data processing system 570 to communicate with other electronic devices. The data processing system 570 may include several different packages or may be contained within a single package on a single package substrate. For example, components of the data processing system 570 may be located on several different packages at one location (e.g., a data center) or multiple locations. For instance, components of the data processing system 570 may be located in separate geographic locations or areas, such as cities, states, or countries.

In one example, the data processing system 570 may be part of a data center that processes a variety of different requests. For instance, the data processing system 570 may receive a data processing request via the network interface 576 to perform encryption, decryption, machine learning, video processing, voice recognition, image recognition, data compression, database search ranking, bioinformatics, network security pattern identification, spatial navigation, digital signal processing, or some other specialized task.

Furthermore, in some embodiments, the DSP block 26 and data processing system 570 may be virtualized. That is, one or more virtual machines may be utilized to implement a software-based representation of the DSP block 26 and data processing system 570 that emulates the functionalities of the DSP block 26 and data processing system 570 described herein. For example, a system (e.g., that includes one or more computing devices) may include a hypervisor that manages resources associated with one or more virtual machines and may allocate one or more virtual machines that emulate the DSP block 26 or data processing system 570 to perform multiplication operations and other operations described herein.

Accordingly, the techniques described herein enable particular applications to be carried out using the DSP block 26. For example, the DSP block 26 enhances the ability of integrated circuit devices, such as programmable logic devices (e.g., FPGAs), to be utilized for artificial intelligence applications while still being suitable for digital signal processing applications.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

Example Embodiments of the Disclosure

The following numbered clauses define certain example embodiments of the present disclosure.

Clause 1.

A digital signal processing (DSP) block comprising:

- a plurality of columns of weight registers, wherein one or more of the plurality of columns of weight registers is configurable to receive values;
- a plurality of inputs configured to receive a first plurality of values and a second plurality of values, wherein the first plurality of values is stored in the plurality of columns of weight registers after being received; and
- a plurality of multipliers, wherein:
  - in a first mode of operation, the plurality of multipliers is configurable to simultaneously multiply each value of the first plurality of values by a value of the second plurality of values; and
  - in a second mode of operation, a first column of multipliers of the plurality of multipliers is configurable to multiply each of a third plurality of values by a fourth plurality of values, wherein at least one value of the third plurality of values or the fourth plurality of values includes more bits than the values of the first and second plurality of values.

Clause 2.

The DSP block of clause 1, wherein the first column of multipliers comprises a first portion of multipliers having a first precision and a second portion of multipliers having a second precision that is less than the first precision.

Clause 3.

The DSP block of clause 2, wherein the first portion of multipliers is configurable to perform multiplication operations on values of the second precision.

Clause 4.

The DSP block of clause 1, wherein the multipliers of the first column of multipliers are configured to perform signed multiplication.

Clause 5.

The DSP block of clause 1, comprising:

a multiplexer network configurable to route a plurality of subproducts generated by the first column of multipliers to compressor circuitry, wherein the compressor circuitry is configured to generate a plurality of vectors from the plurality of subproducts; and an adder configurable to add the plurality of vectors to generate a sum.

Clause 6.

The DSP block of clause 5, wherein the sum is a fixed-point value.

Clause 7.

The DSP block of clause 5, wherein the sum is a floating-point value.

Clause 8.

The DSP block of clause 5, wherein the multiplexer network is configurable to generate an alignment of the plurality of subproducts based on a respective significance of each of the plurality of subproducts.

Clause 9.

The DSP block of clause 5, wherein the multiplexer network is configurable to zero at least one of the plurality of subproducts.

Clause 10.

The DSP block of clause 5, wherein, in the second mode of operation, the DSP block is configurable to set a sign of each value to be multiplied by clearing a most significant bit of the value.

Clause 11.

The DSP block of clause 5, wherein the sum has a first precision that is greater than a second precision of each of the third plurality of values and the fourth plurality of values.

Clause 12.

A digital signal processing (DSP) block comprising:

a plurality of columns of weight registers, wherein one or more of the plurality of columns of weight registers is configurable to receive values; and a multiplexer network, adder circuitry, and a plurality of multipliers, wherein:

in a first mode of operation:

a first plurality of values is stored in the plurality of columns of weight registers after being received;

after storing the first plurality of values in the plurality of columns of weight registers, the plurality of multipliers is configurable to simultaneously multiply each value of the first plurality of values by a value of a second plurality of values to generate a first plurality of products;

the adder circuitry is configurable to receive the first plurality of products and generate a first sum by adding the first plurality of products without shifting any products of the first plurality of products; and in a second mode of operation:

a first portion of multipliers of the plurality of multipliers is configurable to multiply each of a first plurality of values by each value of the second plurality of values to generate a second plurality of products;

the multiplexer network configurable to receive the second plurality of products and generate a shifted plurality of products by shifting at least one of the second plurality of products; and the adder circuitry is configurable to receive the shifted plurality of products and generate a second sum by adding the shifted plurality of products.

Clause 13.

The DSP block of clause 12, in the first mode of operation, the first plurality of values have a shared exponent value.

Clause 14.

The DSP block of clause 12, in the second mode of operation, at least two multipliers of the portion of the plurality of multipliers receive a first value of the first plurality of values and perform a multiplication operation involving the first value.

Clause 15.

The DSP block of clause 14, comprising:

a register configurable to store the first value; and a second multiplexer network configurable to route the first value to the at least two multipliers.

Clause 16.

The DSP block of clause 12, wherein:

each of the first plurality of values has a first precision;

the first plurality of values is generated from a first value having a second precision that is greater than the first precision.

Clause 17.

An integrated circuit device comprising a digital signal processing (DSP) block, the DSP block comprising:

a plurality of columns of weight registers, wherein one or more of the plurality of columns of weight registers is configurable to receive values; and a multiplexer network, adder circuitry, and a plurality of multipliers, wherein:

in a first mode of operation:

a first plurality of values is stored in the plurality of columns of weight registers after being received;

after storing the first plurality of values in the plurality of columns of weight registers, the plurality of multipliers is configurable to simultaneously multiply each value of the first plurality of values by a value of a second plurality of values to generate a first plurality of products;

the adder circuitry is configurable to receive the first plurality of products and generate a first sum by adding the first plurality of products; and in a second mode of operation:

the multiplexer network configurable to receive the first plurality of values and the second plurality of values and route a respective first value of the first plurality of values and respective second value of the second plurality of values to each respective multiplier of a first portion of the plurality of multipliers;

the first portion of the plurality of multipliers is configurable to multiply each of a first plurality of values by each value of the second plurality of values to generate a second plurality of products; and the adder circuitry is configurable to generate a second sum based on the second plurality of products.

Clause 18.

The integrated circuit device of clause 17, comprising a second multiplexer network configurable to receive the second plurality of products and generate a shifted plurality of products by shifting at least one of the second plurality of products, wherein the adder circuitry is configurable to generate the second sum by adding the shifted plurality of products.

Clause 19.

The integrated circuit device of clause 18, wherein, in the first mode of operation, the adder circuitry is configured to generate the first sum without shifting any products of the first plurality of products.

Clause 20.

The integrated circuit device of clause 17, wherein the integrated circuit device comprises a field-programmable gate array (FPGA).

What is claimed is:

1. A digital signal processing (DSP) block comprising:

a plurality of columns of weight registers, wherein one or more of the plurality of columns of weight registers is configurable to receive values; and a multiplexer network, adder circuitry, and a plurality of multipliers, wherein:

in a tensor mode of operation:

a first plurality of values associated with the tensor mode is stored in the plurality of columns of weight registers after being received;

after storing the first plurality of values associated with the tensor mode in the plurality of columns of weight registers, every one of the plurality of multipliers is configurable to simultaneously multiply each value of the first plurality of values associated with the tensor mode by a value of a second plurality of values associated with the tensor mode to generate a first plurality of products associated with the tensor mode;

the adder circuitry is configurable to receive the first plurality of products associated with the tensor mode and generate a first sum by adding the first plurality of products associated with the tensor mode without shifting any products of the first plurality of products associated with the tensor mode; and in a DSP mode of operation:

the multiplexer network is configurable to generate a first plurality of values associated with the DSP mode from an input value of a precision that is greater than a precision of each of the first plurality of values associated with the DSP mode and route the first plurality of values associated with the DSP mode to a first portion of multipliers of the plurality of multipliers comprising fewer than every one of the plurality of multipliers:

the first portion of multipliers of the plurality of multipliers is configurable to multiply each of the first plurality of values associated with the DSP mode by each value of a second plurality of values associated with the DSP mode to generate a second plurality of products associated with the DSP mode;

the multiplexer network is configurable to receive the second plurality of products associated with the DSP mode and generate a shifted plurality of products by shifting at least one of the second plurality of products associated with the DSP mode based on a respective significance of each of the second plurality of products associated with the DSP mode; and the adder circuitry is configurable to receive the shifted plurality of products associated with the DSP mode and generate a second sum by adding the shifted plurality of products associated with the DSP mode.

2. The DSP block of claim 1, in the tensor mode of operation, the first plurality of values associated with the tensor mode have a shared exponent value.

3. The DSP block of claim 1, in the DSP mode of operation, at least two multipliers of the first portion of multipliers of the plurality of multipliers receive a first value of the first plurality of values associated with the DSP mode and perform a multiplication operation involving the first value.

4. The DSP block of claim 3, comprising:

a register configurable to store the first value; and a second multiplexer network configurable to route the first value to the at least two multipliers.

5. The DSP block of claim 1, wherein:

the precision of each of the first plurality of values associated with the DSP mode is a first precision;

the first plurality of values associated with the DSP mode is generated from the input value, wherein the precision of the input value is a second precision that is greater than the first precision.

6. An integrated circuit device comprising a digital signal processing (DSP) block, the DSP block comprising:

a plurality of columns of weight registers, wherein one or more of the plurality of columns of weight registers is configurable to receive values; and a multiplexer network, adder circuitry, and a plurality of multipliers, wherein:

in a tensor mode of operation:

a first plurality of values associated with the tensor mode is stored in the plurality of columns of weight registers after being received;

after storing the first plurality of values associated with the tensor mode in the plurality of columns of weight registers, the plurality of multipliers is configurable to simultaneously multiply each value of the first plurality of values associated with the tensor mode by a value of a second plurality of values associated with the tensor mode to generate a first plurality of products; and the adder circuitry is configurable to receive the first plurality of products and generate a first sum by adding the first plurality of products; and in a DSP mode of operation:

the multiplexer network is configurable to generate a first plurality of values associated with the DSP mode from an input value of a precision that is greater than a precision of each of the first plurality of values associated with the DSP mode, generate a second plurality of values associated with the DSP mode from a second input value of a precision that is greater than a precision of each of the second plurality of values associated with the DSP mode, and route a respective first value of the first plurality of values associated with the DSP mode and respective second value of the second plurality of values associated with the DSP mode to each respective multiplier of a first portion of the plurality of multipliers;

the first portion of the plurality of multipliers is configurable to multiply each of the first plurality of values associated with the DSP mode by each value of the second plurality of values associated with the DSP mode to generate a second plurality of products; and the adder circuitry is configurable to generate a second sum based on the second plurality of products.

7. The integrated circuit device of claim 6, comprising a second multiplexer network configurable to receive the second plurality of products and generate a shifted plurality of products by shifting at least one of the second plurality of products based on a respective significance of each of the second plurality of products, wherein the adder circuitry is configurable to generate the second sum by adding the shifted plurality of products.

8. The integrated circuit device of claim 7, wherein, in the tensor mode of operation, the adder circuitry is configured to generate the first sum without shifting any products of the first plurality of products.

9. The integrated circuit device of claim 6, wherein the integrated circuit device comprises a field-programmable gate array (FPGA).

* * * * *